Aug. 28, 1923.
W. W. BLAKELY ET AL
1,466,442
VEHICLE ANCHORING DEVICE
Filed Oct. 9, 1922
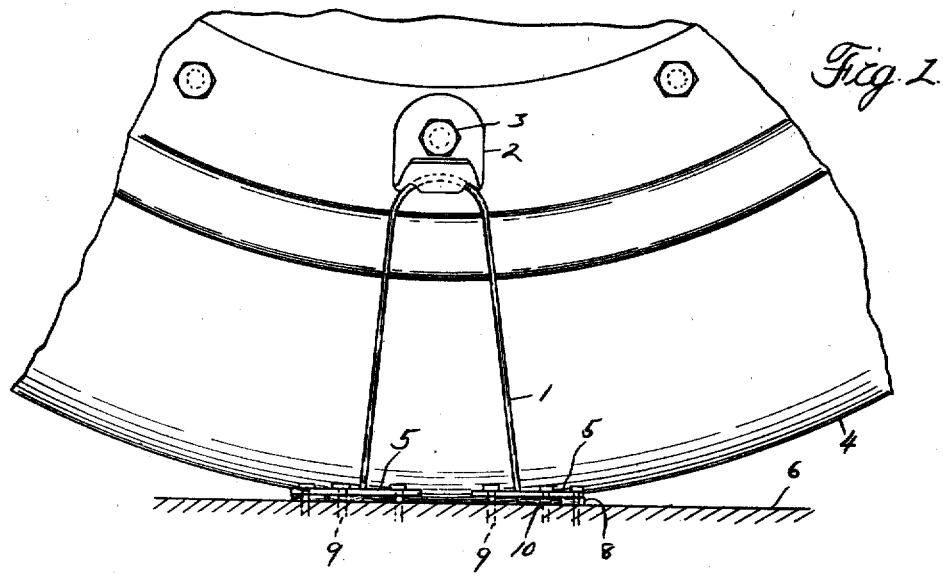
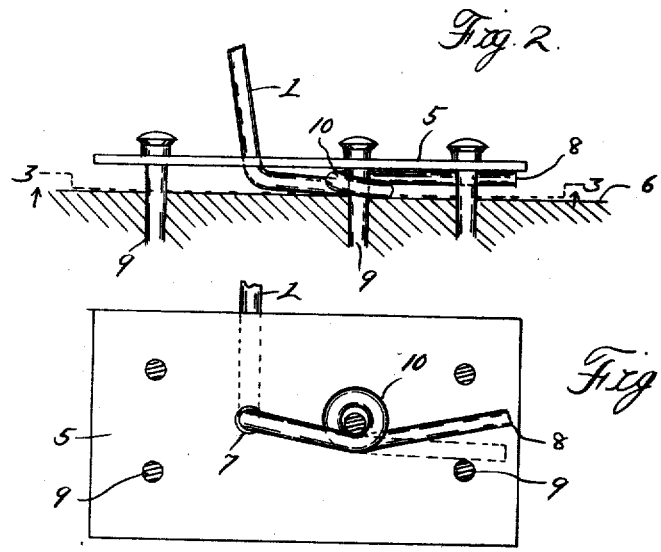
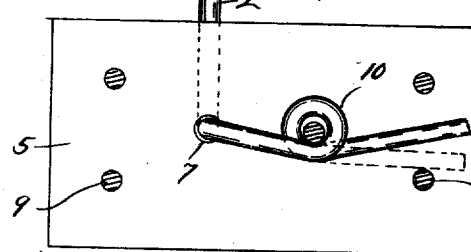
Inventors
William W. Blakely
George C. Fedderman Patented Aug. 28, 1923.

1,466,442

UNITED STATES PATENT OFFICE.

WILLIAM W. BLAKELY AND GEORGE C. FEDDERMAN, OF DETROIT, MICHIGAN; SAID FEDDERMAN ASSIGNOR TO SAID BLAKELY.

VEHICLE ANCHORING DEVICE.

Application filed October 9, 1922. Serial No. 593,280.

*To all whom it may concern:*

Be it known that we, WILLIAM W. BLAKELY and GEORGE C. FEDDERMAN, citizens of the United States of America, residing at Detroit, in the county of Wayne and State of Michigan, have invented certain new and useful Improvements in Vehicle Anchoring Devices, of which the following is a specification, reference being had therein to the accompanying drawings.

This invention relates to anchorage devices and more particularly to devices for anchoring vehicles while undergoing shipment in freight cars or other carriers. The invention may be considered as an improvement upon certain features shown in applicant's co-pending application Serial Number 519,821, filed December 5, 1921.

It is the object of the invention to provide an improved foot portion upon a tie member formed of wire or the like which portion underlies an anchoring plate through which the tie member is passed.

In the drawings:—

Figure 1 is a side view of the improved construction showing the application thereof to a vehicle wheel;

Figure 2 is an enlarged view of the portion of Figure 1 showing features original with this application;

Figure 3 is a section upon line 3—3 of Figure 2, showing the under side of the securing plate.

In these views the reference character 1 designates a tie member formed of heavy wire or like material and having its upper portion engageable in any desired manner with a vehicle or other body to be held in place. Thus for example the tie member may have an arch form, as shown by Figure 1, the bend at the top of the arch being engaged with a hooked plate 2 bolted, as shown at 3, to a vehicle wheel 4.

5 is a pair of anchorage plates whereby the lower ends of the tie member 1 are secured to a floor or other supporting surface 6. The preferred engagement between each tie member and the corresponding plate 5 is established by passing the tie member through an aperture 7 in said plate and bending said member below the plate to form a foot 8. Thus when the plate 3 is secured to the floor 6, as for example by the nails 9, said foot is clamped between the anchorage plate and the floor and the tie member is thus securely held. As a further precaution against the foot 8 being pulled through the aperture 7 when the tie member is under heavy strain a portion of said foot is bent to form a loop or eyelet 10 which being too large to pass through the aperture 7 will strongly resist any force tending to withdraw the foot through said aperture. As a still further safeguard against any shifting of the foot 8, one of the nails 9 is passed through the loop 10. Preferably the aperture 7 of each plate is somewhat more remote from one end of the plate than from the other end. The foot 8 is of a length to extend from said aperture into proximity to the remote end, the loop 10 being formed at an intermediate point of said foot. By so proportioning said foot the same provides a substantial bearing for the plate 5.

The described construction is one that may be very inexpensively formed and yet possesses the requisite strength to resist severe strains. It is to be noted that the eyelet 10 has the nature of a completely closed loop since in forming said eyelet the wire is bent through a complete circle. This is advantageous in reducing a possibility of said eyelet opening out under a severe stress upon the tie member.

It is to be noted also that the end portion of the foot 8 engages between two of the nails 9 so that in case the loop 10 starts to turn responsive to a severe stress upon the tie member 1, said end portion will shortly encounter one of the adjacent nails 9, as shown in dash lines in Figure 3, further turning of the loop being thus prohibited.

What we claim as our invention is:—

1. An anchorage device comprising a securing plate having an opening, and a tie member passing through said opening and bent beneath said plate to form a foot, the latter being spirally bent to form an eyelet, and securing means for said plate passing through said eyelet.

2. An anchorage device comprising a securing plate having an opening, a tie member passing through said opening and bent beneath said plate to form a foot projecting toward one end of said plate, said foot having a portion forming an eyelet, and a securing member for said plate passing through said eyelet.

3. An anchorage device comprising a securing plate having an opening, and a tie member passing through said opening and bent beneath said plate to form a foot, said foot being looped at a distance from said opening to form an eyelet, and a securing member for said plate passing through said eyelet.

4. An anchorage device comprising a securing plate having an opening, fastening members for said plate passing through the same, and a tie member passing through said opening and bent to form a foot beneath said plate, said foot having a loop through which one of said fastening members passes and having an end portion restrained by another of said fastening members from turning through more than a limited angle.

In testimony whereof we affix our signatures.

WILLIAM W. BLAKELY.
GEORGE C. FEDDERMAN.